(12) United States Patent
Rieger

(10) Patent No.: US 8,162,356 B2
(45) Date of Patent: Apr. 24, 2012

(54) TAPER FITTED CONDUITS FOR MOLTEN POLYMER

(75) Inventor: Thomas J. Rieger, Maplewood, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 969 days.

(21) Appl. No.: 11/843,005

(22) Filed: Aug. 22, 2007

(65) Prior Publication Data

US 2009/0053352 A1 Feb. 26, 2009

(51) Int. Cl.
*F16L 19/02* (2006.01)
(52) U.S. Cl. ............ 285/325; 285/124.5
(58) Field of Classification Search ............ 285/124.5, 285/67, 68, 325
See application file for complete search history.

(56) References Cited

U.S. PATENT DOCUMENTS

| | | | | | |
|---|---|---|---|---|---|
| 154,536 | A | * | 8/1874 | Wolf | 285/325 |
| 259,045 | A | * | 6/1882 | Richardson | 285/150.1 |
| 259,048 | A | * | 6/1882 | Richardson | 285/124.5 |
| 510,353 | A | * | 12/1893 | Long | 285/67 |
| 847,472 | A | * | 3/1907 | Hafer | 285/27 |
| 1,161,641 | A | * | 11/1915 | Engle | 285/148.2 |
| 1,169,389 | A | * | 1/1916 | Forsman | 285/325 |
| 1,225,480 | A | * | 5/1917 | Nickolai et al. | 285/67 |
| 1,291,849 | A | * | 1/1919 | Griffiths | 285/325 |
| 1,604,211 | A | * | 10/1926 | Williams | 285/27 |
| 1,739,131 | A | * | 12/1929 | Eick | 285/67 |
| 1,838,574 | A | * | 12/1931 | Ross | 285/325 |
| 1,853,578 | A | * | 4/1932 | Ross | 285/325 |
| 2,056,562 | A | * | 10/1936 | Bridge | 285/18 |
| 2,950,130 | A | * | 8/1960 | Schneider | 285/67 |
| 3,260,539 | A | * | 7/1966 | Herron | 285/24 |
| 3,523,266 | A | * | 8/1970 | King et al. | 439/195 |
| 3,934,605 | A | * | 1/1976 | Legris | 137/271 |
| 4,323,720 | A | * | 4/1982 | Orgeret | 174/21 JS |
| 4,340,097 | A | * | 7/1982 | Ammann et al. | 141/98 |
| 4,460,156 | A | * | 7/1984 | Hazelrigg et al. | 251/149.3 |
| 4,874,306 | A | | 10/1989 | Gearhart | |

(Continued)

FOREIGN PATENT DOCUMENTS

DE 92 00 047 6/1992

(Continued)

OTHER PUBLICATIONS

PCT/US2008/073681 International Search Report, Date of Mailing: Nov. 20, 2008.

(Continued)

*Primary Examiner* — Aaron Dunwoody
(74) *Attorney, Agent, or Firm* — Gregory D. Allen

(57) ABSTRACT

A system for conveying fluids, particularly molten polymer in an extrusion melt train. The system has a first element having a first fluid passage. The first element also has a first interface surface thereon, such that the first interface surface is non-orthogonal to the axis of the first fluid passage. The first element also has a first interlocking feature. The system also has a second element having a second fluid passage. The second element also has a second interface surface thereon, such that the second interface surface is non-orthogonal to the axis of the second fluid passage. The second element also has a second interlocking feature. In use, the first element and the second element are placed in a linking position adjacent each other such that the first fluid passage is in fluid communication with the second fluid passage.

2 Claims, 3 Drawing Sheets

U.S. PATENT DOCUMENTS

| | | | | |
|---|---|---|---|---|
| 5,082,391 A * | 1/1992 | Florida | | 403/342 |
| 5,240,311 A * | 8/1993 | Bunker | | 277/609 |
| 5,626,889 A | 5/1997 | Bittner | | |
| 5,665,403 A | 9/1997 | Bittner | | |
| 5,788,291 A * | 8/1998 | Williams et al. | | 285/325 |
| 5,888,557 A | 3/1999 | Houk | | |
| 6,196,823 B1 | 3/2001 | Coyle et al. | | |
| 6,682,333 B2 | 1/2004 | Ulcej et al. | | |
| 6,981,858 B2 | 1/2006 | Wieder | | |
| 7,052,049 B2 * | 5/2006 | Puttmann | | 285/147.1 |
| 7,300,075 B2 * | 11/2007 | Ebskamp et al. | | 285/208 |
| 2005/0194783 A1* | 9/2005 | Ebskamp et al. | | 285/124.5 |
| 2008/0012290 A1* | 1/2008 | Hamada | | 285/124.5 |
| 2008/0048437 A1* | 2/2008 | Simmons et al. | | 285/124.5 |
| 2008/0087671 A1* | 4/2008 | Kreider | | 220/484 |

FOREIGN PATENT DOCUMENTS

| | | |
|---|---|---|
| EP | 47351 A1 * | 3/1982 |
| EP | 1 762 363 | 3/2007 |
| JP | 07 266405 | 10/2005 |

OTHER PUBLICATIONS

PCT/US2008/073681 Written Opinion of the International Searching Authority, Date of Mailing: Nov. 20, 2008.

* cited by examiner

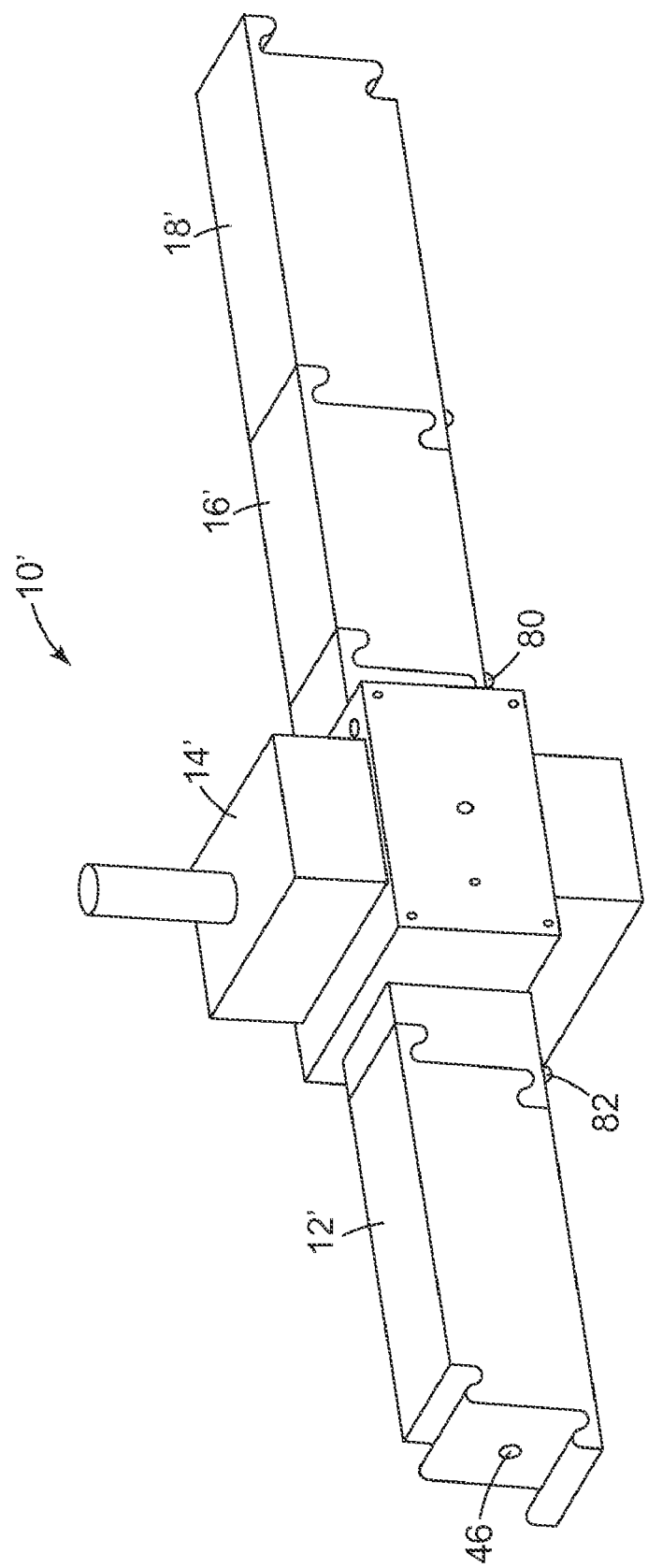

TAPER FITTED CONDUITS FOR MOLTEN POLYMER

TECHNICAL FIELD

The present invention is related to fluid conduits, and more particularly to conduits for molten polymer.

BACKGROUND

In the manufacturing of extruded products, it is generally desirable to attain the purest of extrusions with the least amount of degradation of the molten polymer. This is especially true for products for optical film applications. If even small regions within the melt flow are allowed to re-solidify or dwell overlong in the molten state, specks or streaks may appear in, e.g. the extruded optical film. This may make the film useless for its intended purpose.

Conventionally, as the melted polymer resin flows through the melt system, it may go through one or more gear pumps, filter packs, or melt blocks, interconnected at connection points to form a flow channel. Variable temperatures of connection points or slight mismatches in the alignment of connection points may cause a disruption of resin flow. The residence time of the melted resin will increase dramatically in any area where there is a disruption in flow causing the melt to either re-solidify or degrade and char. As virgin melted resin continues to flow through the melt channel, small particles of re-solidified and charred material may break off, causing imperfections in the finished product.

SUMMARY

The present disclosure is directed to an interconnection system for interconnecting elements in the melt train of an extrusion line. In one embodiment, elements employing this interconnection system may be changed out for maintenance without requiring that the elements be separated on from another in a direction parallel to the axis of the flow conduits for the polymer. In one embodiment, the configuration of the interconnection system may be adapted to allow uniform heating near the junction of one element with the next. In yet another embodiment, the flow conduits in adjacent elements are held in close alignment when the elements are interconnected.

In one respect, the instant disclosure describes a system for conveying fluids. The system has a first element having a first fluid passage. The first element also has a first interface surface thereon, such that the first interface surface is non-orthogonal to the axis of the first fluid passage. The first element also has a first interlocking feature. The system also has a second element having a second fluid passage. The second element also has a second interface surface thereon, such that the second interface surface is non-orthogonal to the axis of the second fluid passage. The second element also has a second interlocking feature. In use, the first element and the second element are placed in a linking position adjacent to each other such that the first fluid passage is in fluid communication with the second fluid passage. When in this position, the first interface surface is held in contact with the second interface surface by an interaction of the first interlocking feature with the second interlocking feature.

In some embodiments the first and the second interlocking features each have a tapered face such that their interaction when in the linking position tends to force the first interface surface against the second interface surface. At least one of the first or the second elements may have an alignment pin adapted to be received in an alignment receptacle in the other element so as to guide the elements into the linking position. Multiple interconnection systems may be used to link various elements to form a complete or partial melt train for an extrusion process.

DESCRIPTION OF THE DRAWINGS

FIG. 4 shows a perspective view of a melt train analogous to the prior art melt train of FIG. 1, but employing elements provided with complementary ends according to FIG. 3.

DETAILED DESCRIPTION

Figure 1:
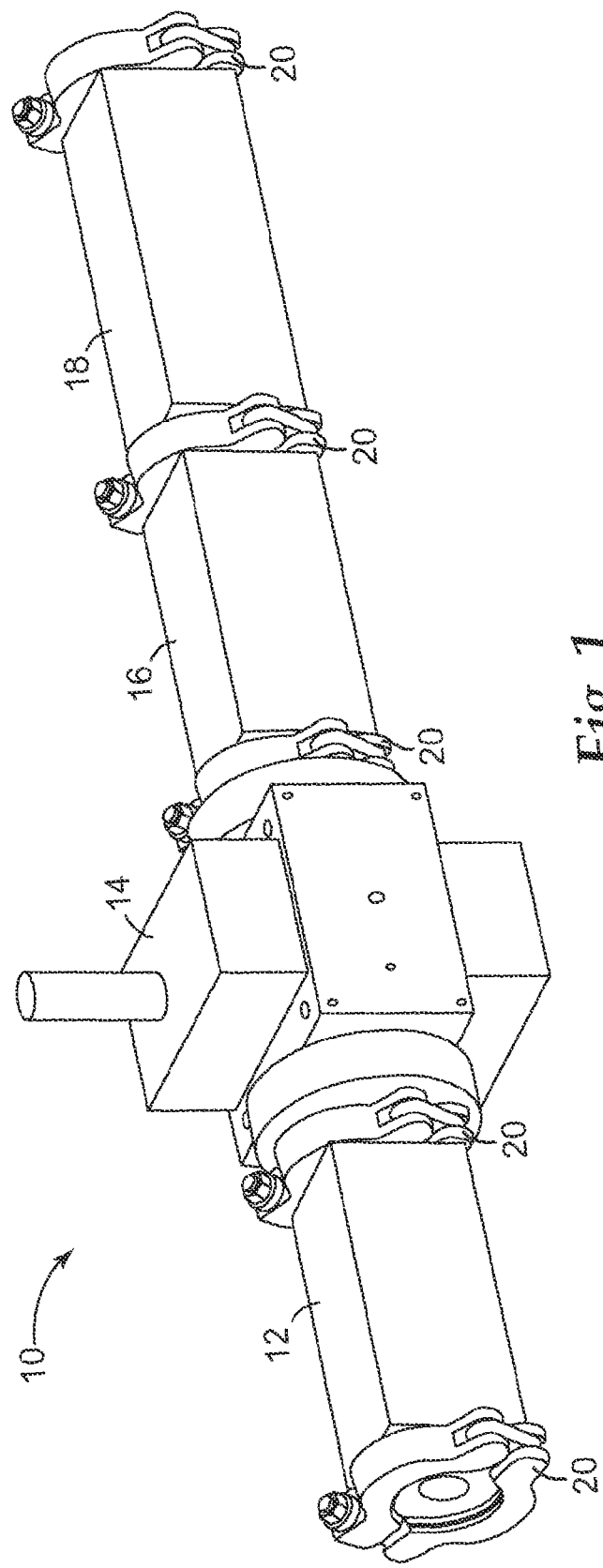
FIG. 1 shows a perspective view of a melt train according to the prior art.

Referring now to FIG. 1, a perspective view of a melt train according to the prior art is illustrated. The melt train 10 includes elements such as melt block 12, and gear pump 14, a melt block 16, and a filter 18. The joints between the elements are held together with clamshell clamps 20. It will be observed that the construction of the clamshell clamps 20 does not permit the positioning of heating in the region of the joints. Further, in many such installations, complementary curved interface surfaces are used on the elements at the joints in order to facilitate a leak-free connection. Unfortunately, while this end is served, it becomes harder to align the respective flow passages without creating mismatched areas where flow stagnates. It also forces at least some element to be moved in a direction parallel to the combined flow passage in order to let an individual element be removed for maintenance.

Figure 2:
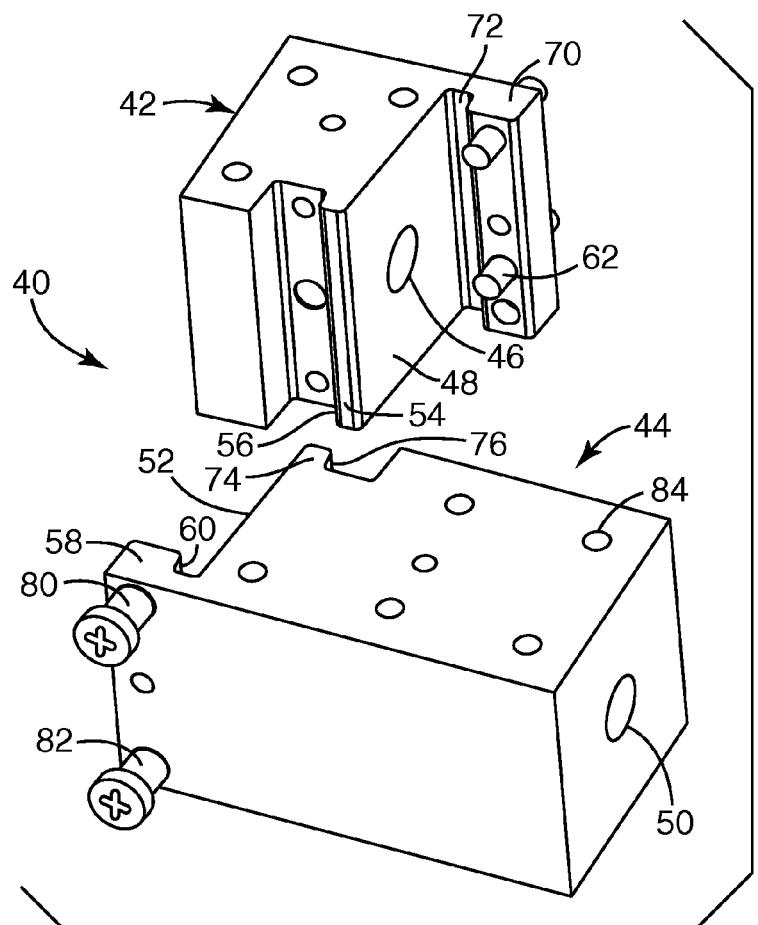
FIG. 2 shows an exploded perspective view of complementary ends of a first and a second element of a system for conveying fluids according to the present invention.

Referring now to FIG. 2, an exploded perspective view of a detail of complementary ends of a first and a second element of a system for conveying fluids according to one embodiment of the present invention is illustrated. The system 40 includes first element 42 and second element 44. For simplicity, this Figure is a detail of only the interfacing or interconnecting ends of the elements; it will be appreciated that other features, not shown, may adapt these interconnecting ends to gear pumps, melt blocks, filters, or other elements found on a melt train.

The first element 42 has a first fluid passage 46 opening at a first interface surface 48. In this view the first interface surface 48 is generally planar, and that plane is non-orthogonal to the axis of the first fluid passage 46. Similarly, the second element 44 has a second fluid passage 50 opening at a second interface surface 52. The second interface surface 52 is also generally planar, and that plane is non-orthogonal to the axis of the first fluid passage 50. It has been found that a taper of about 5 degrees from the normal defined by the axis of the flow passages 46 and 50 gives good results. However, other tapers may work, including from about 4 degrees to less than 15 degrees from normal, including degrees in between (5, 6, 7, 8, 9, 10, 11, 12, 13, and 14).

The first element 42 has a first interlocking feature 54, which includes a tapered surface 56. The second element 44 has a second interlocking feature 58, which includes a tapered surface 60. As will be seen with respect to one embodiment below, when the first and second elements 42 and 44 are brought together into a linking position, the first interface surface 48 is held in contact with the second interface surface 52 by an interaction of the first interlocking feature 54 with the second interlocking feature 58. In the linking position, the first and second fluid passages 46 and 50 will be brought into fluid communication, preferably coaxial, with each other.

In this illustrated embodiment, the first element 42 has an alignment pin 62 adapted to be received in an alignment receptacle (on the far side of second element 44, hidden from this view) so as to guide the elements 42 and 44 into the linking position. In one embodiment, the first or second element, 42 or 44, may possesses the alignment pin.

In this illustrated embodiment, the first element 42 includes a first supplementary interlocking feature 70, which has a tapered surface 72. Also, the second element 44 includes a second supplementary interlocking feature 74, which conveniently has a tapered surface 76. As will be seen with more particularity with respect to one embodiment below, when the first and second elements 42 and 44 are brought together into a linking position, the first supplementary interlocking feature 70 interacts with second supplementary interlocking feature 74 in a manner similar to, and synergistic with, the interaction of the first interlocking feature 54 with second interlocking feature 58. That is, to hold the first interface surface 48 in fluid-tight contact with the second interface surface 52. This illustrated embodiment includes two pairs of interlocking features; one skilled in the art will appreciate that other embodiments could include one pair of interlocking features, or more than two: for example 3, 4, 5, 6, 7, or even more. In the illustrated embodiment, a pair of bolts 80 and 82 is present for the purpose of holding the first element to the second element in the linking position. The use of bolts is merely illustrative; other fastening techniques will suggest themselves to the skilled artisan. The illustrated embodiment includes cross-passages 84 for the insertion of cartridge heaters if desirable for evening the heat distribution when the melt train is up and running. The artisan with appreciate that the flat surfaces on the exterior of the joint lend themselves to the application of blanket heaters when this is convenient.

Figure 3:
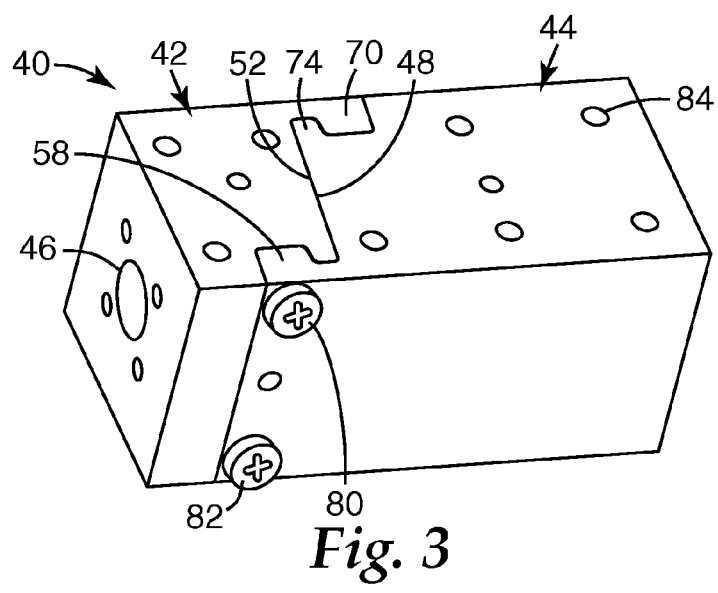
FIG. 3 shows a perspective detail view of the complementary ends of the first and second elements of FIG. 2 after being placed into a linking position.

Referring now to FIG. 3, a perspective detail view of the complementary ends of the first and second elements of the embodiment shown in FIG. 2, after they have been placed into the linking position, is illustrated. Bolts 80 and 82 have been tightened, drawing the first interlocking feature 54 into firm contact with second interlocking feature 58, and also drawing the first supplementary interlocking feature 70 into firm contact with second supplementary interlocking feature 74. Between them, the two pairs of interlocking features force the first interface surface 48 in fluid-tight contact with the second interface surface 52.

Referring now to FIG. 4, a perspective view of a melt train analogous to the prior art melt train of FIG. 1, but employing elements provided with complementary ends according to FIG. 3, is illustrated. The novel melt train 10' includes elements such as melt block 12', and gear pump 14', a melt block 16', and a filter 18'.

Elements according to the present invention may be constructed from the same sorts of materials, such as stainless steel, that the components they otherwise represent, e.g. melt blocks, gear pumps, filters, etc., are traditionally made from. However, it has been found that good results are obtained when the interface surfaces are particularly smooth and have very exact taper angles. Therefore EDM wire machining is considered to be particularly suitable for these surfaces.

While the invention has been particularly shown and described with reference to various embodiments thereof, it will be understood by those skilled in the art that various other changes in the form and details may be made therein without departing from the spirit and scope of the invention.

What is claimed is:

1. A melt train comprising:
    at least two components, each component having a through passage and at least one interface surface, the respective interface surfaces for the at least two components in contact with one another such that the through passages of the two components are in fluid communication with each other, wherein the interface surfaces in contact with one another are not orthogonal to the axis of the through passage, wherein the first element has a first interlocking feature, the second element has a second interlocking feature, and the first interface surface is held in contact with the second interface surface by an interaction of the first interlocking feature with the second interlocking feature, wherein each component has a length along the axis of the through passage, wherein the two components each have an exterior, wherein the two components have a joint between the exteriors, and wherein there is at least one collective flat major surface on their exteriors that spans the joint and the lengths of the components.

2. The melt train according to claim 1 wherein at least one of the two components have cross-passages for the insertion of heaters.

* * * * *